(12) United States Patent
Kwon et al.

(10) Patent No.: US 9,957,188 B2
(45) Date of Patent: May 1, 2018

(54) METHOD AND APPARATUS FOR PROCESSING EDGE OF GLASS BY USING HIGH FREQUENCY INDUCTION HEATER

(71) Applicant: LAMINEX CO., LTD, Hwaseong-si (KR)

(72) Inventors: Kyung Tae Kwon, Suwon-si (KR); Pyo Eon Kim, Seoul (KR); Seong Bae Park, Ansan-si (KR)

(73) Assignee: LAMINEX CO., LTD, Hwaseong-si, Gyeonggi-Do (KR)

( * ) Notice: Subject to any disclaimer, the term of this patent is extended or adjusted under 35 U.S.C. 154(b) by 369 days.

(21) Appl. No.: 14/418,643

(22) PCT Filed: Jul. 30, 2013

(86) PCT No.: PCT/KR2013/006825
§ 371 (c)(1),
(2) Date: Jan. 30, 2015

(87) PCT Pub. No.: WO2014/021606
PCT Pub. Date: Feb. 6, 2014

(65) Prior Publication Data
US 2015/0259237 A1 Sep. 17, 2015

(30) Foreign Application Priority Data

Aug. 1, 2012 (KR) ........................ 10-2012-0084531

(51) Int. Cl.
*C03B 33/09* (2006.01)
*C03B 33/08* (2006.01)
*B28D 1/22* (2006.01)

(52) U.S. Cl.
CPC .............. *C03B 33/08* (2013.01); *B28D 1/221* (2013.01); *C03B 33/09* (2013.01); *B65G 2249/04* (2013.01); *Y02P 40/57* (2015.11)

(58) Field of Classification Search
CPC .......... C03B 33/08; C03B 33/09; B28D 1/221
See application file for complete search history.

(56) References Cited

U.S. PATENT DOCUMENTS 4,653,362 A * 3/1987 Gerber ..................... B26D 7/08
                                              219/221
2010/0320179 A1* 12/2010 Morita ................. B28D 5/0011
                                              219/121.69

(Continued)

FOREIGN PATENT DOCUMENTS

JP       2001-294437 A    10/2001
JP       3719904 B2  * 11/2005    ........... C03B 29/025

(Continued)

OTHER PUBLICATIONS

International Search Report for PCT/KR2013/006825, dated Nov. 19, 2013 (Nov. 19, 2013), the whole document.

*Primary Examiner* — Lisa L Herring
(74) *Attorney, Agent, or Firm* — Steptoe & Johnson LLP

(57) ABSTRACT

Method and apparatus for heat treating and processing an edge of a large thin glass sheet used for a liquid crystal TV or the like. The method for processing an edge of a glass substrate according to the present invention is characterized by cutting an edge of a glass substrate by bringing a heated member into contact with the edge of the glass substrate that is cooled, and then moving the heated member. According to the present invention, provided is a new method of removing the edge of glass in a strip shape without producing dust. Also, according to the method of the present invention, since it is unnecessary to heat the glass at a high temperature, a large furnace is not necessary. Further, since a post-processing operation such as preheating or annealing is unnecessary, the manufacturing process is highly simplified.

5 Claims, 3 Drawing Sheets

(56) References Cited

U.S. PATENT DOCUMENTS

2012/0055905 A1* 3/2012 Schmidt .................. B23H 9/02
                                                        219/121.11
2013/0305784 A1* 11/2013 Gromann .............. C03B 5/0336
                                                        65/29.14

FOREIGN PATENT DOCUMENTS

| KR | 2003-0054720 A | 7/2003 | |
|---|---|---|---|
| KR | 2007-0030167 A | 3/2007 | |
| KR | 2008-0101261 A | 11/2008 | |
| KR | 20090023678 A * | 3/2009 | ............. B28D 1/221 |
| KR | 2010-0076916 A | 7/2010 | |
| KR | 10-1069621 B1 | 10/2011 | |
| KR | 2011-0131563 A | 12/2011 | |
| WO | 2005/044512 A2 | 5/2005 | |
| WO | WO 2014021606 A3 * | 3/2014 | ............. C03B 33/09 |

* cited by examiner

[Fig. 1]
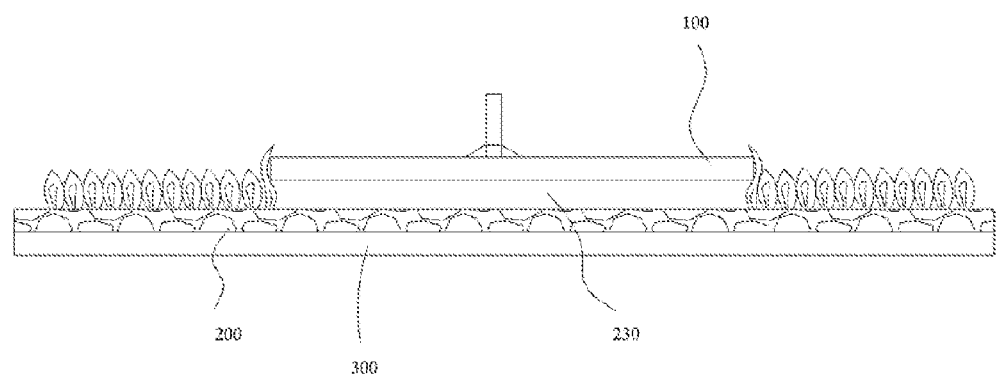
PRIOR ART
[Fig. 2]
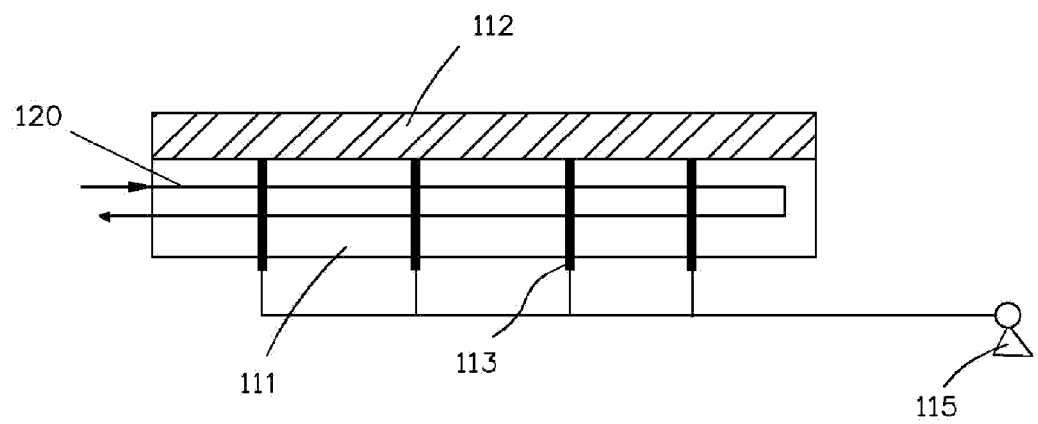

[Fig. 3]
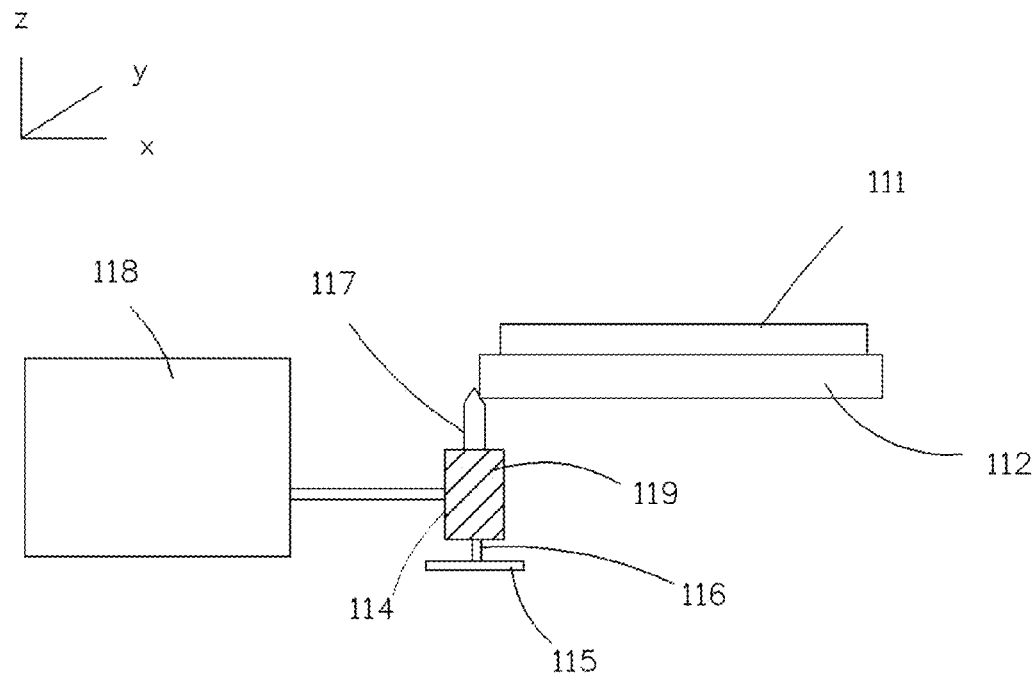
[Fig. 4]
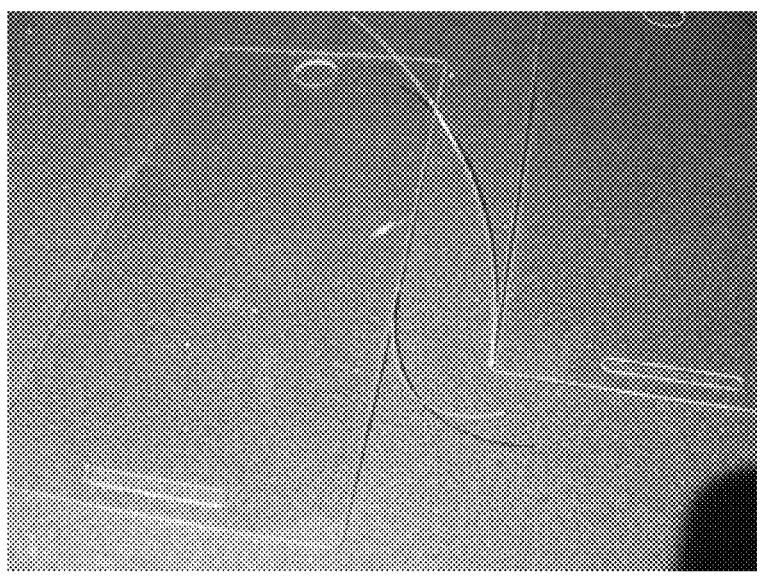

[Fig. 5]
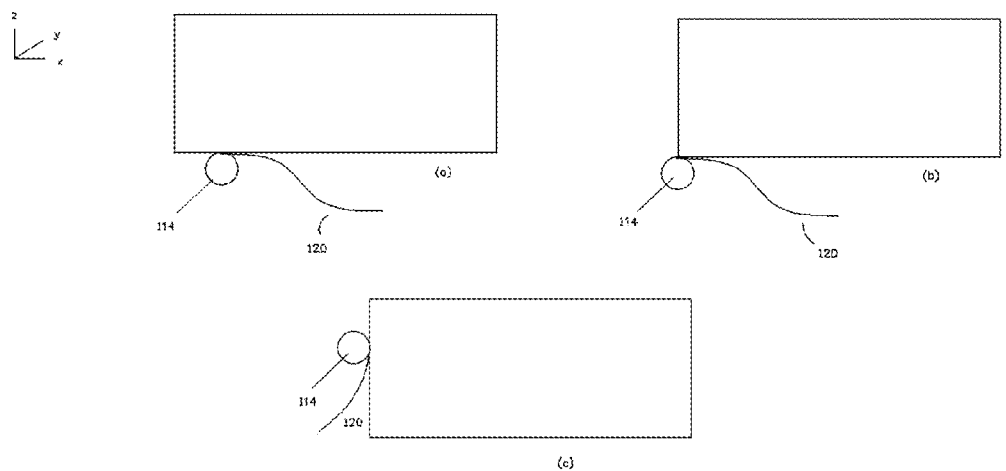
[Fig. 6]
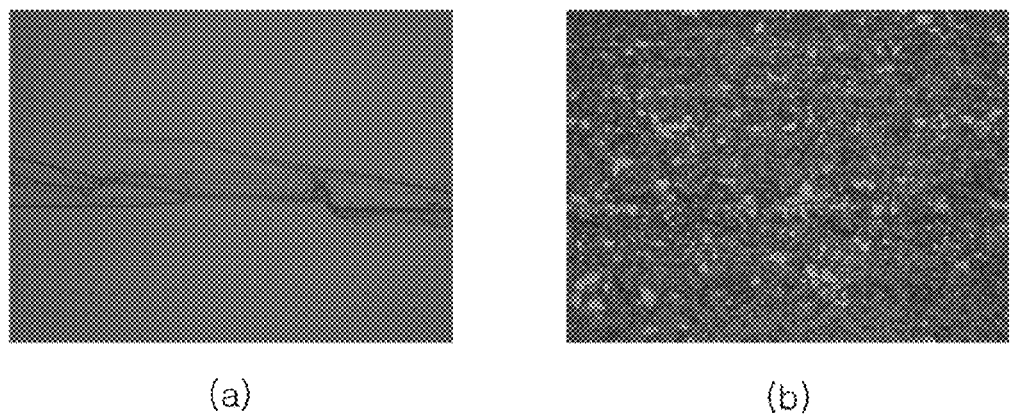

METHOD AND APPARATUS FOR PROCESSING EDGE OF GLASS BY USING HIGH FREQUENCY INDUCTION HEATER

CLAIM FOR PRIORITY

This application claims priority under 35 USC 371 to International Application No. PCT/KR2013/006825, filed Jul. 30, 2013, which claims priority to Korean Patent Application No. 10-2012-0084531, filed Aug. 1, 2012, each of which is hereby incorporated by reference in its entirety.

TECHNICAL FIELD

The present invention relates to a method and apparatus for processing an edge of glass and, more particularly, to a method and apparatus for cutting an edge of a glass sheet using a high-frequency induction heater.

BACKGROUND ART

As disclosed in WO 2005/044512, in order to have a surface finish such as for use in flat panel displays, a thin glass sheet is generally processed such that it is cut into a desired shape and then sharp edges of the cut glass sheet are removed via grinding and/or polishing.

However, this method for holding, processing and carrying the glass sheet has many drawbacks. First, finishing particles may become a main source for the contamination of the surface of the glass sheet. Thus, at the end of finishing, large-scale washing and drying processes are required in order to wash the glass sheet and remove the finishing particles from the glass sheet. Of course, additional washing and drying processes carried out at the end of the finishing increase basic costs of a finishing line and thus overall manufacturing cost. Further, particles and chips caught between a conveyer belt and the glass sheet may seriously damage the surface of the glass sheet. Such damages may interrupt a series of processing processes, which decreases the number of goods found acceptable and thus processability.

To prevent this problem, Korean Patent Application No. 2006-7009339 proposes an apparatus that includes an encapsulating device for supporting opposite surfaces of a glass sheet and a processing device for processing the edges of the glass sheet close to the supported opposite surfaces at a first side of the encapsulating device. The encapsulating device substantially prevents particles, created when the processing device processes the edges of the glass sheet, and other contaminating materials from being brought into contact with the material at a second side of the encapsulating device.

Further, Korean Patent Application No. 2007-0047784 proposes an apparatus for grinding edges of a material by alternately moving diamond grindstones provided on a grinder.

Further, Korean Patent Application No. 2001-0085114 proposes a method of chamfering a glass sheet using a diamond wheel, along with the provision in which a nozzle is mounted in proximity to the chamfered part so that compressed air is supplied through the nozzle to blow fine glass particles created during chamfering, and the compressed air containing the glass particles is then suctioned away.

However, such device and method have problems in that, since they process the edges of the glass sheet using grinding or chamfering, drawbacks, such as glass particles, breakage of the edges during grinding, surface-scratches owing to glass particles, exposure of a worker to glass particles, and the like, are essentially caused. Further, the ground or chamfered edge of the glass sheet may become opaque due to scratches by glass particles.

Thus, there is a need for a new processing method and apparatus for basically preventing the creation of glass particles while ensuring a transparent processed surface.

To solve these problems, the inventors proposed a method and apparatus for grinding an edge of a glass sheet disclosed in Korean Patent Application No. 10-2010-0051062, wherein, as shown in FIG. 1, not a lower part 230, but an edge of the glass sheet 100 is selectively melted by a flame created by a flaming plate 300 via a porous structure 200. However, this method and apparatus are suitable for processing of 3 to 10 inch glass articles for cellular phones or tablet PCs, but has drawbacks, including: additionally requiring a flaming furnace, being unsuitable for processing 40 or more inch glass articles for LCD TVs, and requiring complicated manufacturing processes such as preheating and annealing of the glass sheet before and after processing. Further, there is the problem that it is difficult to regulate the degree of the flame, which may lead to inhomogeneous processing of the edge of the glass sheet.

Therefore, there is a continuous need to provide a new method of easily processing an edge of a large-scale glass sheet as well as a small-scale glass sheet.

DISCLOSURE

Technical Problem

An object of the present invention is to provide a new method of processing an edge of a glass sheet using a high-frequency induction heater.

Another object of the present invention is to provide an apparatus for cutting a glass sheet using a high-frequency induction heater.

A further object of the present invention is to provide a glass substrate of which the cut edge is transparent.

Technical Solution

In order to accomplish the above objects, the present invention provides a method of cutting an edge of a moving glass sheet, the method including bringing a cooled edge of the glass sheet into contact with a member induction heated with high-frequency.

The term 'cooled glass' used herein means that the glass substrate has a temperature lower than the surround by being forcedly cooled.

The cooled edge of the glass may be obtained by entirely cooling the glass sheet or selectively cooling only an edge of the glass sheet. However, the entire glass sheet is preferably cooled for stable cooling control.

In an embodiment, the glass sheet may be cooled by placing the glass sheet for predetermined time in a low temperature environment. Alternatively, the glass sheet may be cooled by bring it into contact with a cooling plate maintained at a low temperature. Preferably, the glass sheet may be cooled and cut while being fixed to the cooling plate maintained at a constant temperature, in order to prevent the glass sheet from rising in temperature during the cutting process.

In a preferred embodiment, the cooling plate may have a cooling channel through which a coolant flows, and a plurality of suction through-holes that are formed in the bottom of the cooling plate in order to allow the glass sheet to be vacuum-suctioned onto the cooling plate.

In the present invention, the low temperature means a temperature that is lower than room temperature (25° C.), preferably by 10° C. or more, in order to allow the glass sheet coming into contact with a heating member to be cut and separated without creating glass particles. In a preferred embodiment, the temperature of the glass sheet may be 10° C. or less, more preferably, 0~10° C., for saving on energy to be consumed in excessive cooling.

If the temperature of the glass sheet is too high, a portion near the edge of the glass sheet is cut too much, making it difficult to obtain accurate edge-cutting. Further, if the temperature of the glass sheet is too low, energy is excessively consumed, possibly making it difficult to obtain a constant process control.

The term "high-frequency induction heating" used herein means a phenomenon that a dielectric positioned around a coil through which high-frequency current flows is heated rapidly due to a partial heat-loss of hysteresis and an eddy current caused due to an electromagnetic induction.

In the present invention, the high-frequency induction heater has advantages in that, since energy is effectively collected onto the heating member passing through the coil, it is possible to obtain a rapid increase in temperature, and it is particularly suitable to prevent a decrease in temperature of the heating member occurring due to the contact with the cooling member.

In the present invention, the dielectric forms the heating member to be brought into contact with the cooled glass. The temperature of heating member means the temperature that is increased to a glass temperature Tg or more. The glass temperature Tg may vary from 750° C. to 1300° C. depending on the kind of glass.

In an embodiment, the temperature of the heating member may be higher than Tg by 50° C. or more, preferably by 100° C. or more, more preferably by 200° C.~500° C., for proper cutting of the edge of the glass sheet.

The term 'contact' used herein means that the cooled glass sheet and the heating member are brought into physical contact with each other. Practically, the contact is accompanied by a weak contact pressure in order to adjust the width of the glass sheet to be cut. In a preferred embodiment, the contact pressure between the heating member and the cooled glass sheet may be 0.1~3.0 $Kg_f/cm^2$, and more preferably 0.5~1.5 $Kg_f/cm^2$. Excessive high contact pressure increases the amount of the glass sheet to be cut, which is not adequate in processing of an edge of a thin glass sheet. Further, excessive low contact pressure excessively decreases the amount of the glass sheet to be cut, which causes a reduction in productivity of a large-scale thin glass item such as for TVs.

In the present invention, the heating member may be configured such that a rod-type dielectric passes through an inductive coil and is fastened, and a contact part is formed as a conical needle that is suitable to process a corner of a thin glass sheet.

In the present invention, the glass substrate and the heating member may be relatively moved by the movement of the glass substrate, the heating member, or both the glass substrate and the heating member. The moving speed of the glass substrate may be adjusted, taking account of productivity, a cutting depth, temperature difference, and pressure difference.

In the present invention, the edge of the glass sheet may be cut at a distance of 50 μm~5 mm, preferably 0.1 mm~3 mm, along horizontal and vertical faces from the edge at which the horizontal and vertical faces intersect. The cut edge is cut into a strip shape in order to prevent secondary damage by glass particles or glass pieces.

In a preferred embodiment, the edge of the glass substrate is cut to have a dimension of 0.1 mm~3 mm under cutting conditions including a temperature of the glass sheet of 0~10° C., a temperature of the heating member of Tg of the glass sheet+200 to 500° C., the contact pressure of the heating member of 0.1~3 $Kg_f/cm^2$, and a movement speed of the glass sheet of 0.5~5 cm/s.

In an aspect, the present invention provides a method of processing an edge of a glass substrate by cutting the edge into a strip shape while bringing a cooled edge of the glass substrate that is moving into contact with a heating member induction-heated with high frequency.

In another aspect, the present invention provides an apparatus for processing an edge of a glass substrate, the apparatus including: a glass substrate; a moving cooling plate to which the glass substrate is attached; a heating member coming into contact with the edge of the moving glass substrate; and a high-frequency induction heater heating the heating member.

The glass substrate and the heating member may be relatively moved preferably by the movement of the glass substrate. The moving speed of the glass substrate may be adjusted depending on the kind of the substrates to be heated, the temperature of the heating member, and a cutting site.

In a further aspect, the present invention provides a glass substrate having a transparent cut edge that is formed by cutting a cooled edge of the glass substrate that is moving, into a strip shape, while bring the edge of the glass substrate into contact with a heating member induction-heated with high frequency.

Advantageous Effects

According to the present invention, there is provided a new method of removing an edge of glass in a strip shape without the production of dust. Also, according to the method of the present invention, since it is unnecessary to heat the glass at a high temperature, a large furnace is unnecessary. Also, since a post-processing operation such as preheating or annealing is unnecessary, the manufacturing process is highly simplified.

Particularly, it is possible to perform a continuous processing by rotation of the glass substrate when processing a corner edge of the glass substrate, thereby providing increased productivity.

DESCRIPTION OF DRAWINGS

FIG. 1 illustrates a method of flame-processing the edge of a glass sheet according to the related art;

FIG. 2 is a cross-sectional view of a cooling bed for cooling a glass sheet while moving it according to the present invention;

FIG. 3 is a view showing the contact state between the cooling bed, the glass sheet and a heating member according to the present invention;

FIG. 4 is a photograph showing the glass sheet of which an edge is cut, and a cut piece cut from the glass sheet;

FIG. 5 illustrates the contact states between the heating member and the edge of the glass sheet according to the present invention; and FIG. 6 shows photographs of a transparent edge (a) of the glass sheet cut by the present cutting apparatus and of an opaque edge (b) of the glass sheet ground by a conventional grinder.

BEST MODE

Hereinafter, embodiments of the present invention will be described in detail. The embodiments are described merely for illustrative purposes, and do not limit the invention. The scope of the present invention is defined by the attached claims.

FIG. 2 is a cross-sectional view of a cooling bed for cooling a glass sheet while moving it according to the present invention; FIG. 3 is a view showing the contact state between the cooling bed, the glass sheet, and a heating member according to the present invention; FIG. 4 is a photograph showing the glass sheet of which edge is cut, and a cut piece cut from the glass sheet; and FIG. 5 illustrates the contact states between the heating member and the edge of the glass sheet according to the present invention.

As shown in FIG. 2, a glass sheet (or glass substrate) 112 is positioned on an upper portion of a cooling bed 111. The size of the cooling bed 111 is preferably substantially the same as that of the glass sheet 112, but it may become larger or smaller depending on implementing conditions. The cooling bed 111 is provided therein with a coolant channel 120 for maintaining a constant temperature of the cooling bed 111. Further, the cooling bed 111 is provided on the surface with suction through-holes 113 for suction-fastening of the glass sheet 112. The suction through-holes 113 completely pass through the cooling bed from upper to lower surfaces thereof, and are connected with a vacuum pump to form a vacuum state. The vacuum suction of the glass sheet at the bottom thereof has advantages in that, since fasteners are not required on lateral sides of the glass sheet to fasten the glass sheet 112, the heating member can easily contact the edges of the glass sheet 112.

As shown in FIG. 3, the heating member 114 includes a rod-type body 116 and a conical contact part 117 on an upper end of the body 116.

The heating member 114 is fixed such that a distal end of the body 116 is fixed to a stationary plate 115, keeping itself stationary when contacting the edge of the glass sheet. The heating member is heated by an induction coil 119 connected to a high-frequency induction heater 118. The high-frequency induction heater is commercially available, and the operating condition may vary depending on the state of the glass sheet or surrounding temperature. For example, the operating condition may include 200~300 V, 20~50 A, 250~500 Hz, and a power efficiency of 50~90%.

The glass sheet 112 is moved in a Y-axis direction perpendicular to an XZ plane, and an edge thereof is cut into a strip shape 120 by being brought into contact with an inclined surface of the contact part 117.

As shown in FIG. 4, the edge of the glass sheet 112 is cut into the strip shape 120 without forming cut glass particles.

As shown in FIG. 5, a round corner of the glass sheet 112 is formed using the heating member 114. When the glass sheet 112 is moved in an X-axis while the heating member 114 is kept stationary, as shown in section (a), the glass sheet 112 is cut into a strip shape; as shown in section (b), the glass sheet is moved to the corner along X-axis; and as shown in section (c), the glass sheet 112 is moved along an Y-axis. Since the heating member 114 has a conical shape laterally-symmetrical about a Z-axis, the glass sheet 112 can be moved along the Y-axis after being easily rotated in a state being brought into contact with the heating member 114.

As shown in FIG. 6, a photograph of edges of the glass sheet cut from the corners and a comparative photograph of edges of the glass sheet ground from the corners are provided. The cut faces and the ground faces are respectively measured with respect to Rp, Rv, Rz, Ra, Rq, and the measuring results are shown in Tables 1 and 2, respectively. Here, by micrometer unit, Rp is maximum peak Height, Rv is maximum Valley depth, Rz is an average distance between highest peak and lowest peak, Ra is the arithmetic mean of an absolute value, and Rq is a root mean square.

TABLE 1

Measurements of cut faces

|   | Rp   | Rv   | Rz   | Ra   | Rq   |
|---|------|------|------|------|------|
| 1 | 2.44 | 2.11 | 4.55 | 0.30 | 0.46 |
| 2 | 1.78 | 1.58 | 3.35 | 0.26 | 0.39 |
| 3 | 1.72 | 1.64 | 3.36 | 0.27 | 0.40 |
| 4 | 1.48 | 1.55 | 3.03 | 0.29 | 0.44 |

TABLE 2

Measurements of ground faces

|   | Rp   | Rv    | Rz   | Ra   | Rq   |
|---|------|-------|------|------|------|
| 1 | 3.90 | 4.52  | 8.41 | 0.53 | 0.71 |
| 2 | 2.19 | 3.941 | 6.13 | 0.50 | 0.67 |
| 3 | 1.61 | 3.48  | 5.08 | 0.47 | 0.65 |
| 4 | 3.39 | 3.82  | 7.21 | 0.48 | 0.66 |

The invention claimed is:

1. A method of processing an edge of a moving cooled glass substrate, the method comprising cutting the edge of the moving cooled glass substrate while bringing by contacting the edge of the moving cooled glass substrate with a heating member, wherein a contact pressure between the heating member and the edge of the moving cooled glass substrate is 0.1 to 3.0 Kg$_f$/cm$^2$.

2. The method of claim 1, wherein the edge of the moving cooled glass substrate is cut into a strip shape.

3. The method of claim 1, wherein the heating member includes a rod-type needle heated by an induction-heating.

4. The method of claim 1, wherein the edge of the moving cooled glass substrate is maintained under cutting conditions including;
   a temperature of the moving cooled glass substrate of 0 to 10° C.,
   a temperature of the heating member higher than a temperature of the moving cooled glass substrate by 200 to 500° C., and
   a movement speed of the moving cooled glass substrate of 0.5 to 5 cm/s.

5. The method of claim 1, wherein the heating member is a heating member induction-heated with high frequency having a range of frequency of 200 to 500 Hz.

* * * * *